(12) United States Patent
Havens et al.

(10) Patent No.: US 6,363,748 B1
(45) Date of Patent: Apr. 2, 2002

(54) METHOD OF MAKING PROTECTIVE FILTER LENS

(75) Inventors: Thomas G. Havens, Painted Post; David J. Kerko; Brent M. Wedding, both of Corning, all of NY (US)

(73) Assignee: Corning SA, Avon Cedex (FR)

( * ) Notice: Subject to any disclaimer, the term of this patent is extended or adjusted under 35 U.S.C. 154(b) by 0 days.

(21) Appl. No.: 09/714,083

(22) Filed: Nov. 16, 2000

Related U.S. Application Data

(62) Division of application No. 09/299,445, filed on Apr. 26, 1999, now Pat. No. 6,197,711.
(60) Provisional application No. 60/099,534, filed on Sep. 9, 1998, and provisional application No. 60/107,380, filed on Nov. 6, 1998.

(51) Int. Cl.[7] ............................ C03C 19/00; C03C 21/00
(52) U.S. Cl. ...................... 65/30.11; 65/30.1; 65/32.1; 65/61
(58) Field of Search .................... 65/30.1, 30.11, 65/32.1, 61

(56) References Cited

U.S. PATENT DOCUMENTS

| | | | | |
|---|---|---|---|---|
| 3,208,860 A | * | 9/1965 | Armistead et al. ............ 501/13 |
| 4,190,451 A | * | 2/1980 | Hares et al. ................... 501/13 |
| 4,251,278 A | * | 2/1981 | Hares ........................... 501/13 |
| 4,284,686 A | * | 8/1981 | Wedding ....................... 428/334 |
| 4,290,794 A | * | 9/1981 | Wedding .................... 65/30.11 |
| 4,979,976 A | * | 12/1990 | Havens et al. ............. 65/30.11 |
| 5,244,845 A | * | 9/1993 | Kerko et al. ................... 501/13 |
| 5,381,193 A | * | 1/1995 | Wedding ..................... 351/163 |
| 5,482,901 A | * | 1/1996 | Morgan et al. ................ 501/13 |
| 5,491,117 A | * | 2/1996 | Kerko et al. ................... 501/13 |

OTHER PUBLICATIONS

Ikeda, H.; Dai, W.; Higaki, Y., "A study on colorimetric errors caused by quantizing color information", Instrumentation and Measurement, IEEE Transactions on, vol. 41 Issue: 6, pp 845–849, Dec. 1992.*

* cited by examiner

Primary Examiner—Sean Vincent
(74) Attorney, Agent, or Firm—Milton M Peterson

(57) ABSTRACT

An ophthalmic, protective, filter lens, and a method of producing such lens, the lens having a ratio of Z and Y tristimulus values between 0.25–0.40, a dominant wavelength between 570–580 nm. on a color mixture diagram, a sharp transmission drop between 450–500 nm. and a transmission not over 30% between 400–450 nm. The lens is produced by firing a silver halide-containing, photochromic glass lens in a hydrogen-containing atmosphere within a temperature range of 465° C. to 495° C. for less than 20 minutes.

3 Claims, 2 Drawing Sheets

METHOD OF MAKING PROTECTIVE FILTER LENS

This is a division of application Ser. No. 09/299,445, filed Apr. 26, 1999 now U.S. Pat. No. 6,197,711.

This application claims the benefit of U.S. Provisional Application, Ser. No. 60/099,534, filed Sep. 9, 1998, entitled PROTECTIVE FILTER LENS, by T. G. Havens, D. J. Kerko and B. M. Wedding, and Supplemental Provisional Application, Ser. No. 60/107,380, filed Nov. 6, 1998, entitled PROTECTIVE FILTER LENS, by T. G. Havens, D. J. Kerko and B. M. Wedding.

FIELD OF THE INVENTION

A photochromic filter lens having a reduced surface layer to control spectral transmission and method of making.

BACKGROUND OF THE INVENTION

U.S. Pat. No. 4,284,686 (Wedding) describes a series of ophthalmic filter lenses and their production. These lenses are specially designed to alleviate the discomfort experienced in bright light by individuals afflicted with certain visual deficiencies.

All of the commercially important photochromic glasses are glasses which contain a precipitated, microcrystalline, silver halide phase. It is this phase which is considered to cause the reversible darkening of the glass upon exposure to light. U.S. Pat. No. 3,208,860 (Armistead et al.) provides the basic description of this family of glasses. Subsequent work has resulted in the development of many new families of photochromic glasses exhibiting faster darkening and/or fading response. U.S. Pat. No. 4,190,451 (Hares et al.), for example, provides a description of some recently developed photochromic glasses of this type.

The patent discloses glasses which are particularly suitable for use in the inventive method. Such glasses consist essentially, expressed in weight percent on the oxide bases, of about 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxides:$B_2O_3$ varies between about 0.55–0.85 and the weight ratio Ag:(Cl+Br) ranges between about 0.65–0.95. Those glasses may also optionally contain up to about 10% total of other ingredients selected from the group in the indicated proportions of 0–6% $ZrO_2$, 0–3% $TiO_2$, 0–0.5% PbO, 0–7% BaO, 0–4% CaO, 0–3% MgO, 0–6% $Nb_2O_5$, 0–4% $La_2O_3$ and 0–2% F. Finally, those compositions are compatible with the conventional glass colorants selected from the transition metal oxides and rare earth metal oxides. Hence, up to about 1% total of transition metal oxide colorants and/or up to 5% total of rare earth metal oxide colorants may be included to modify the color of the bulk glass.

Colored, ophthalmic lenses, developed in accordance with the Wedding patent teachings, have provided relief for patients having light or glare sensitivity problems. Dye-impregnated, plastic lenses have been developed as alternatives. The latter are sometimes referred to as "blockers" since they are stated to absorb all of the light below a certain wavelength.

A major problem with the "blocker" lens is that total absorption of part of the spectrum greatly distorts color perception. This may also occur in the surface colored, glass lens with an unduly long treating time. However, the time of the reducing treatment may be adjusted so that a carefully controlled, small amount of blue transmission, referred to as a "blue leak," occurs. This provides a less severe distortion of color perception.

Nevertheless, it would be desirable to further improve natural color perception in a protective filter lens.

Subsequent developments have enabled the filter lenses disclosed in the Wedding—686 patent to be produced with much shorter firing times. For example, a filter lens, having its cutoff over a wavelength range of about 450–500 nm. in the visible, can be produced by firing the lens in flowing hydrogen for two hours at about 476° C.

However, it is still necessary to "front surface" the lens after firing. This involves removing the reduced glass from the front surface of the lens. This is necessary to permit access of actinic radiation to darken the photochromic glass. Further, if a fused, multifocal lens is to be produced, it is necessary to remove the reduced layer in order to fuse the segment in place.

One object of the present invention is to obviate the need for the front surfacing procedure.

Another object is to provide a protective filter lens that closely approximates transmission of a natural color scene, that is, allows a viewer to see the actual, undistorted colors in a scene.

A further object is to provide these features either in a lens that is untinted, or in one that has a fixed tint imparted to the glass.

It is also an object to reduce the time factor in the process without impairing the effectiveness of the lens.

Another object is to enable processing of photochromic, progressive lenses.

SUMMARY OF THE INVENTION

The invention resides, in part, in an ophthalmic, protective, filter lens having a ratio of Z/Y tristimulus values between 0.25–0.40, a dominant wavelength between 570–580 nm. on a color mixture diagram, a sharp transmission drop between 450–500 nm., and transmission not over 30% between 400–450 nm.

The invention further resides in a method of producing an ophthalmic, protective filter lens which comprises firing a silver halide-containing, photochromic glass lens in a hydrogen-containing atmosphere within a temperature range of 465° C. to 495° C. for a time less than 20 minutes, but sufficiently long enough to provide Z/Y tristimulus values in the lens such that the ratio of Z/Y is between 0.25–0.40.

BRIEF DESCRIPTION OF THE DRAWINGS

In the accompanying drawings.

BRIEF DESCRIPTION OF THE INVENTION

Figure 1:
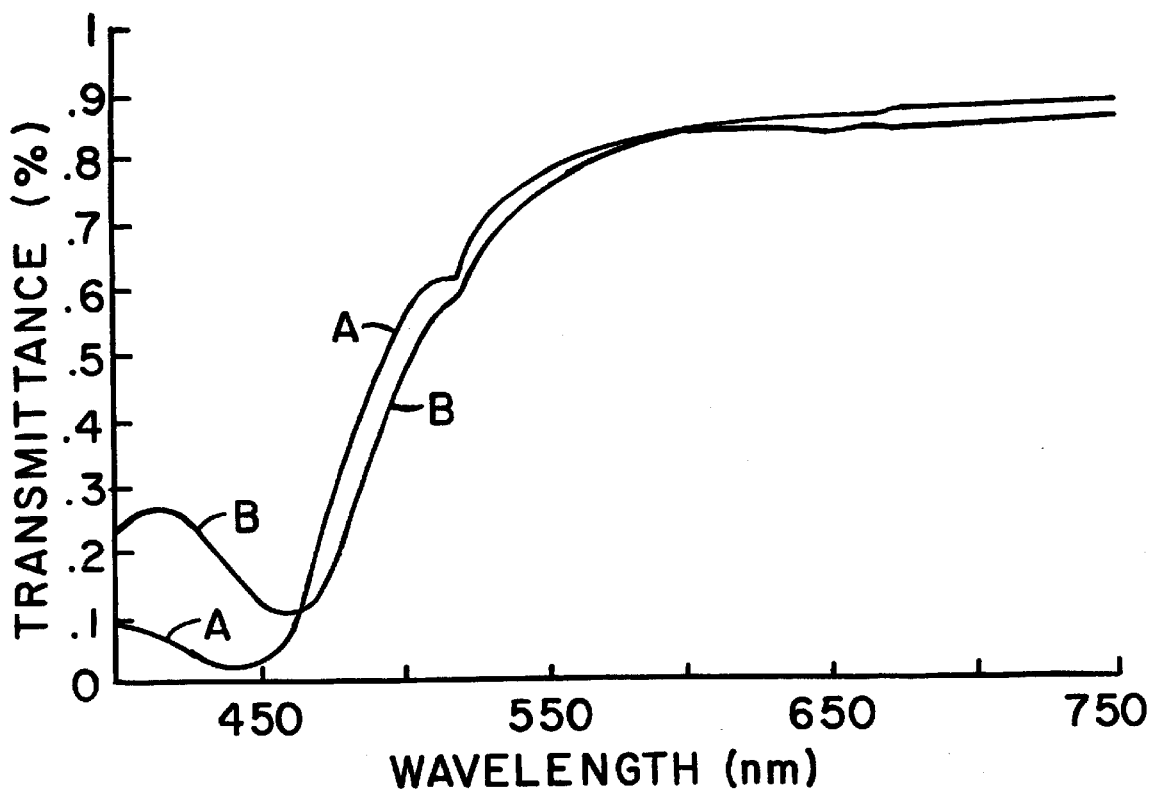
FIG. 1 is a graphical representation of transmittance data comparing a conventional, commercial lens with a lens in accordance with the present invention.

Several, different protective filter lenses have been developed based on the Wedding—686 patent teaching. One of these, known under the designation, CPF 450, is designed to provide spectral transmission cutoff between 500–450 nm.

This lens has proven technically effective for its purpose. The present invention, however, is based on studies directed at improving the natural color perception of this lens, as well as simplifying its production.

As noted above, studies have shown that the blue end of the spectrum, that is, wavelengths below about 500 nm., is very important in determining natural color perception. Thus, as noted, total blocking of transmission in this region, as with a "blocker" lens, provides serious, color scene distortion. Transmission at the lower wavelengths, that is, at the blue end of the visible spectrum, is much less than at longer wavelengths. Nevertheless, its significance is much greater in determining proximity to natural color perception.

Earlier studies have defined filter lenses in terms of dominant wavelength and color purity with respect to a region in a 1931 CIE color mixture diagram. In such diagram, color data are plotted in terms of x and y values on their respective axes. The values are then computed by the weighted ordinate method using 1931 Illuminant C and the CIE Standard Observer.

The values may be compared to either Illuminant C, a value defined in terms of light from a northern sky, or Illuminant A, a value determined by the spectral distribution from a tungsten lamp. The latter is commonly considered to be a white light.

Our present studies show that the ratio of the Z tristimulus value to the Y tristimulus value, Z/Y, is a very useful parameter in defining spectral transmittance at the blue end of the spectrum, that is, in a range of 400–500 nm. Therefore, we have here used that ratio, rather than spectral purity, for describing our lens.

Currently, the CPF 450 filter lens is produced by firing a selected, photochromic glass lens in a hydrogen atmosphere for two hours at about 476° C. The selected glass is designated as Code 8122. It has a composition, as calculated in weight percent on an oxide basis, as follows:

| | | | |
|---|---|---|---|
| $SiO_2$ | 56.3 | Cl | 0.22 |
| $B_2O_3$ | 18.1 | Br | 0.15 |
| $Al_2O_3$ | 6.2 | Ag | 0.21 |
| $K_2O$ | 5.7 | CuO | 0.006 |
| $TiO_2$ | 2.2 | $Er_2O_3$ | 0.25 |
| $Na_2O$ | 4.1 | Pd | 0.0002 |
| $ZrO_2$ | 5.0 | | |
| $Li_2O$ | 1.8 | | |

The $Er_2O_3$ and Pd contents are included to impart a fixed brown tint to the lens. These colorants may be omitted if a clear, untinted glass is desired. While the invention was developed using this glass, it is not so limited. For example, other available photochromic glasses may be so treated.

One such glass, Code 8135, has the following composition, again presented in weight percent on an oxide basis:

| | | | |
|---|---|---|---|
| $SiO_2$ | 56.4 | Cl | 0.215 |
| $B_2O_3$ | 18.1 | Br | 0.16 |
| $Al_2O_3$ | 6.2 | Ag | 0.24 |
| $ZrO_2$ | 5.0 | CuO | 0.0057 |
| $TiO_2$ | 1.9 | CoO | 0.082 |
| $Na_2O$ | 4.1 | NiO | 0.144 |
| $K_2O$ | 5.7 | | |
| $LiO_2$ | 1.8 | | |

The colorant combination of CoO and NiO is included to provide a neutral gray tint to the lens. Again, this combination may be omitted if an untinted glass is desired. Other known colorants may be included to provide other fixed tints to a lens.

Protective, filter lenses are commonly produced by firing a suitable photochromic glass lens in a flowing hydrogen atmosphere to provide a thin reduced layer over the entire lens. While other reducing atmospheres may be employed, pure hydrogen has been found most effective. After the reduction treatment, the reduced layer on the front surface of the lens is removed to permit access of activating radiation to impart photochromic behavior. This is accomplished, for example, by grinding and polishing the front surface of the lens.

It is a feature of the present invention that the need for this operation is obviated. Fortuitously, sufficient photochromic activating radiation is transmitted through the reduced front surface of the present lens to avoid the need for front surfacing. Thus, the present lens and process eliminate a time consuming and expensive, grinding and polishing operation. This not only provides a significant cost savings, but broadens a product line to include progressive-type lenses.

FIG. 1 is a graphical representation in which wavelengths across the visible spectrum are plotted in nm. on the horizontal axis, while transmittance in percent is plotted on the vertical axis.

Transmission curves for two lenses are shown in the FIGURE. Curve A is the transmission curve for a current CPF 450 lens. Curve B is a transmission curve for a present lens, identified in TABLE I, infra, as lens 3.

It will be observed that, at wavelengths above about 460 nm, the two curves are essentially the same. However, the lens prepared in accordance with the present invention, lens 3, has markedly higher transmittance values in the 400–460 nm wavelength range than does the current lens. This greater transmission in the blue end of the spectrum is a key virtue of the present invention.

Transmittances of the present lens are generally greater than 10%, but not over about 30%, at any given wavelength in the 400–460 nm range. In contrast, the transmittance values for the current CPF 450 lens are generally below 10% in this range.

Specific Embodiments

Polished, piano lenses having a nominal thickness of 2 mm. were prepared from both the Code 8122 and the Code 8135 photochromic glasses. These lenses were fired in a flowing atmosphere of hydrogen gas in a tube furnace for varying times and temperatures.

TABLE I, below, sets forth the glass, and the time and temperature of the firing cycle, for each lens tested. Firing time is given in minutes (min.), and temperature is given in ° C.

TABLE I

| | Glass | Temp. (° C.) | Time (min.) |
|---|---|---|---|
| 1 | Code 8122 | 476° | 120 |
| 2 | Code 8122 | 485° | 20 |
| 3 | Code 8122 | 476° | 8 |
| 4 | Code 8135 | 476° | 8 |

The visible-wavelength, spectral transmittances were measured. Those data were used to calculate tristimulus values by the weighted ordinate method using the 1931 CIE Standard Observer and Illuminant C. Data are given in the TABLE II below:

TABLE II

| Parameter | 1 | 2 | 3 | 4 |
| --- | --- | --- | --- | --- |
| X | 66.2 | 66.3 | 67.1 | 33.1 |
| Y | 73.6 | 73 | 71.6 | 36.9 |
| Z | 14.8 | 15.8 | 22.8 | 13.3 |
| x | 0.4284 | 0.4276 | 0.4156 | 0.3971 |
| y | 0.4761 | 0.4703 | 0.4436 | 0.4433 |
| Z/Y | 0.201 | 0.217 | 0.318 | 0.361 |

Figure 2:
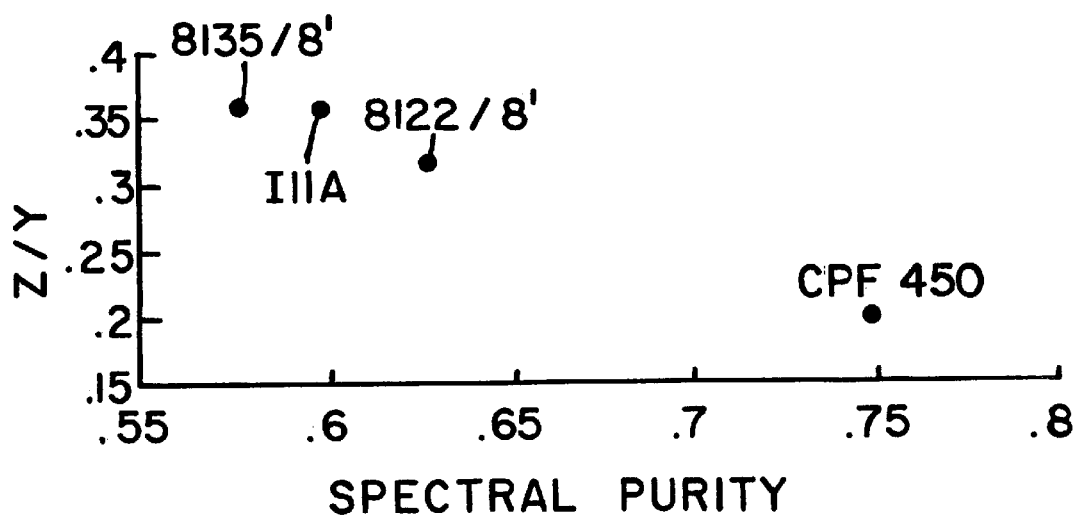
FIG. 2 is a graphical representation in which the Z/Y ratio for several different lenses and Illuminants are plotted against spectral purity.

FIG. 2 is a plot of the Z/Y ratio vs. spectral purity for several filter lenses calculated using Illuminant C. Also indicated is the Z/Y ratio for Illuminant A (III. A) vs. the spectral purity found using the Illuminant C white point. The Z/Y ratio for Illuminant C (III. C) is about 1.2, well outside the scope of FIG. 2, and not shown.

The present, inventive, filter lenses have Z/Y ratios similar to that of Illuminant A, which is known to provide excellent color rendition. We believe that the excellent, color rendition performance of these lenses is a consequence of this close relationship.

When the chromaticity coordinates of the inventive lenses are plotted on a color mixture diagram, the dominant wavelength is found to be between 570 and 580 nm. The range of preferred Z/Y ratios is 0.25–0.40.

The retina of the human eye has three types of cone photoreceptors that provide signals to produce color vision. These are designated S, M and L cones indicating that they are more sensitive in the short, middle, or long wavelength portion of the visible spectrum.

Figure 3:
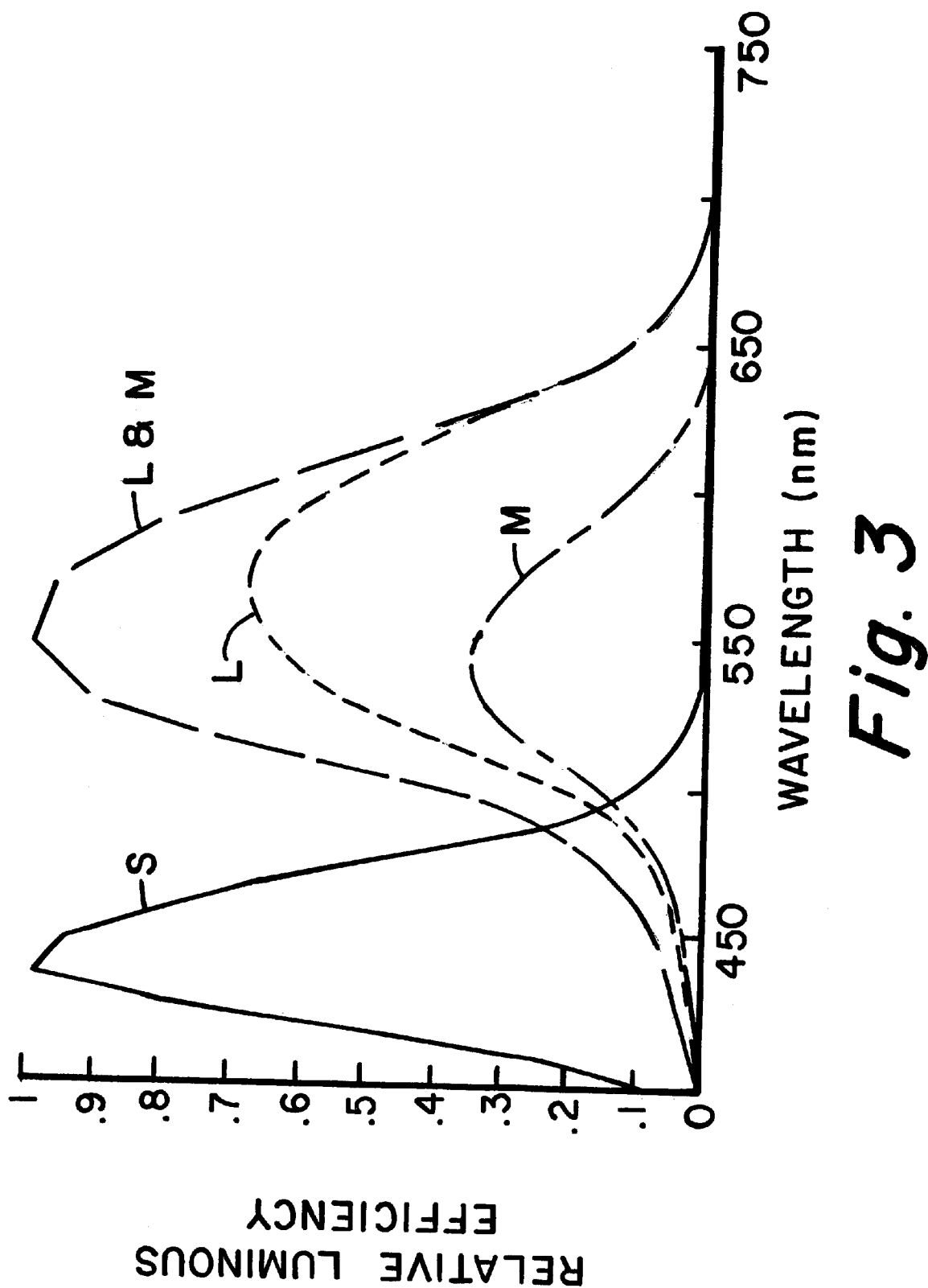
FIG. 3 is a graphical representation in which the relative luminous efficiencies for the three types of cone photoreceptors are plotted against wavelengths of visible light.

FIG. 3 is a graphical representation in which relative luminous efficiency is plotted on the vertical axis and wavelengths of the visible spectrum are plotted in nanometers on the horizontal axis. The relative luminous efficiencies for each type of cone photoreceptor are plotted against wavelengths. The resulting efficiency curve for each cone type is designated by S, M, or L. A curve designated L+M gives the weighted efficiency sums for the L and M cones. (The ordinate scale was chosen to have the S and L+M curves peak at unity.) The weighted sum is used because the L and M cones are not present in equal numbers.

The y-bar and x-bar functions of the Standard Observer are used in calculating the Y and Z tristimulus values. When these y-bar and x-bar functions are compared to data from FIG. 3, it is seen that the weighted sum represents the luminous efficiency function for photopic vision, and that the z-bar and S luminous efficiency functions are the same. Thus, the ratio Z/Y relates the short wavelength-sensitive, cone stimulus to the photopic stimulus.

The present invention provides inter alia,

1. A filter lens having filtering properties approximating those of the CPF 450 lens, but having surface coloration on both polished surfaces. This avoids a need to "front surface" a lens.

2. A lens that is similar in appearance to the CPF 450 product, but has higher transmittance in the blue end of the spectrum. This provides a more natural scene.

3. A lens similar to the above made with a glass having a fixed tint.

4. A short time process for making lenses having these characteristics.

We claim:

1. A method of producing an ophthalmic, protective filter lens which comprises firing a silver halide-containing, photochromic glass lens in a hydrogen-containing atmosphere within a temperature range of 465° C. to 495° C. for a time less than 20 minutes, but sufficiently long to provide Z and Y tristimulus values in the lens such that the ratio of the Z and Y tristimulus values Z/Y is between 0.25–0.40.

2. A method in accordance with claim 1 which comprises firing the glass lens on a time-temperature cycle equivalent to about eight minutes at 476° C.

3. method in accordance with claim 1 wherein the lens is composed of an $R_2O$—$Al_2O_3$—$B_2O_3$—$SiO_2$ base glass containing photochromic constituents Ag, Cl, Br and CuO in small amounts sufficient to impart photochromic behavior to the glass lens, the method comprising polishing at least the front surface of the lens and then reducing the polished surface to provide a surface coloration that transmits sufficient active radiation to activate the photochromic constituents.

* * * * *